(12) United States Patent
Wright et al.

(10) Patent No.: US 8,776,116 B2
(45) Date of Patent: Jul. 8, 2014

(54) SYSTEMS, METHODS, APPARATUS, AND ARTICLES OF MANUFACTURE TO IDENTIFY TIMES AT WHICH LIVE MEDIA EVENTS ARE DISTRIBUTED

(71) Applicants: David Howell Wright, Safety Harbor, FL (US); Mark G. Welch, Palm Harbor, FL (US)

(72) Inventors: David Howell Wright, Safety Harbor, FL (US); Mark G. Welch, Palm Harbor, FL (US)

(73) Assignee: The Nielsen Company (US) LLC, Schaumburg, IL (US)

( * ) Notice: Subject to any disclaimer, the term of this patent is extended or adjusted under 35 U.S.C. 154(b) by 0 days.

(21) Appl. No.: 13/708,476

(22) Filed: Dec. 7, 2012

(65) Prior Publication Data
US 2013/0198792 A1 Aug. 1, 2013

Related U.S. Application Data

(60) Provisional application No. 61/593,088, filed on Jan. 31, 2012.

(51) Int. Cl.
*H04N 7/10* (2006.01)
*H04N 7/025* (2006.01)
*H04H 60/32* (2008.01)

(52) U.S. Cl.
USPC ...... 725/36; 725/9; 725/19; 725/20; 725/135; 348/161

(58) Field of Classification Search
CPC ................ H04N 21/23424; H04N 21/47205
USPC ............... 725/9, 14, 19, 20, 35, 36, 131, 135, 725/139; 348/161
See application file for complete search history.

(56) References Cited

U.S. PATENT DOCUMENTS

| | | | |
|---|---|---|---|
| 6,421,358 B1 | 7/2002 | Stimmel et al. | |
| 7,036,139 B2* | 4/2006 | Aras | 725/66 |
| 7,908,616 B2 | 3/2011 | Jeong | |
| 8,046,787 B2* | 10/2011 | Cerrato | 725/9 |
| 2007/0124754 A1* | 5/2007 | Miyauchi et al. | 725/8 |
| 2008/0184297 A1* | 7/2008 | Ellis et al. | 725/39 |
| 2008/0238659 A1* | 10/2008 | Houde et al. | 340/539.13 |
| 2008/0271082 A1* | 10/2008 | Carter et al. | 725/51 |
| 2009/0150917 A1* | 6/2009 | Huffman et al. | 725/9 |
| 2010/0162283 A1* | 6/2010 | Jeong | 725/9 |
| 2010/0223642 A1* | 9/2010 | Knudson et al. | 725/41 |
| 2010/0246955 A1* | 9/2010 | Wright et al. | 382/173 |
| 2011/0067067 A1* | 3/2011 | Ellis | 725/50 |
| 2011/0069230 A1 | 3/2011 | Polumbus et al. | |
| 2012/0215903 A1* | 8/2012 | Fleischman et al. | 709/224 |
| 2012/0240142 A1* | 9/2012 | Rose | 725/14 |
| 2012/0331494 A1* | 12/2012 | Pontual et al. | 725/9 |
| 2013/0160053 A1* | 6/2013 | Williamson et al. | 725/34 |

* cited by examiner

*Primary Examiner* — Pinkal R Chokshi
(74) *Attorney, Agent, or Firm* — Hanley, Flight & Zimmerman, LLC (57) ABSTRACT

Systems, methods, apparatus, and articles of manufacture to identify times at which live media events are distributed are disclosed. An example method includes collecting feed data representative of source feeds associated with respective live media events, collecting distribution data representative of a plurality of distributions of the source feeds, and comparing, using a processor, the distribution data to the feed data to generate a list identifying times at which the live media events were distributed via corresponding distributions.

30 Claims, 9 Drawing Sheets

SYSTEMS, METHODS, APPARATUS, AND ARTICLES OF MANUFACTURE TO IDENTIFY TIMES AT WHICH LIVE MEDIA EVENTS ARE DISTRIBUTED

RELATED APPLICATIONS

This patent claims priority to U.S. Provisional Patent Application No. 61/593,088, filed Jan. 31, 2012, the entirety of which is hereby incorporated by reference.

FIELD OF THE DISCLOSURE

This disclosure relates generally to audience measurement, and, more particularly, to systems, methods, apparatus, and articles of manufacture to identify times at which live media events are distributed.

BACKGROUND

In addition to scheduled, pre-recorded programming, television networks present live broadcast events, such as sports events or live news events. In some cases, the live broadcast events are scheduled to start at a first time and end at a second time, but in fact begin and/or end at different times than their scheduled times. This can occur when, for example, the start time of a later event must be later than the end time of an earlier event (e.g., consecutive, co-located sports matches). This can also occur when a first event runs long (e.g., goes into overtime, extra innings, etc.).

DETAILED DESCRIPTION

Advertisers are interested in the viewership or audience composition of live sporting events, because many such sporting events have a substantial audience. Additionally, advertisers are interested in the audience of television programming prior to and/or following the live media events. Audience measurement services, such as those provided by The Nielsen Company, LLC, measure the audiences of programs and provide the audience information (e.g., size and demographics of an audience of a program) to the advertisers and/or advertisement or advertisement time slot sellers to enable these parties to make informed advertising decisions.

In some cases, audience measurement is performed based, at least in part, on scheduled start and end times. However, the end time of a prior program and/or the start time of the subsequent program may be different than the scheduled time. Differences between the scheduled live media event start and/or end times are then manually entered with cooperation between the audience measurement service provider and the broadcasters. Such manual methods can be costly and inconvenient.

To overcome these deficiencies, example systems, methods, apparatus, and articles of manufacture disclosed herein automatically identify times at which live media events are broadcast. In a disclosed example method, one or more feed data collectors collect feed data representative of source feeds associated with a plurality of live media events. Distribution data collectors also collect distribution data representative of respective distributions. In some examples, distributions occur in multiple geographical areas, such as local broadcast areas. In some other examples, distributions are independent of geographical location, such as with Internet or satellite delivery. A distribution data resolver compares the distribution data to the feed data to generate a list, where the list identifies times at which the live media events were distributed via corresponding distributions. Such example methods lower costs and may further increase the accuracy and/or precision with which audience information is collected for live media events.

Most local broadcast networks (e.g., network-affiliated television stations) have control over which of a set of live event feeds (e.g., source feeds) are transmitted by the local broadcast network. In some cases, the manager of a distributor (e.g., a local broadcast network) that is scheduled to show a first live media event may decide to change from distributing (e.g., broadcasting, streaming, transmitting, etc.) a first network feed to distributing a second, different network feed. This type of switch is referred to herein as an "on-the-fly" switch, because the switch from one event feed to a second event feed is performed during the event feed. An on-the-fly switch may occur to, for example, attract or retain audience members when the first, scheduled live media event is less interesting than the second live media event. The audience measurement service records the change in programming to appropriately credit the live media event with the audience exposure.

In some examples disclosed herein, a live media event identifier compares a code embedded or otherwise present in and/or with a distribution to a code embedded or otherwise present in and/or with the feed data to identify the distributed source feed. In some other examples, the live media event identifier compares a code embedded or otherwise present in and/or with the distribution to a library of codes to identify the source feed.

While examples described below refer to broadcast regions, broadcasters, and broadcasts, the examples may be applied to any type of content distribution. For example, any one or more of over-the-air broadcasting, cable delivery, satellite transmission, Internet delivery (e.g., digital streaming), and/or any other distribution media may be used. A local broadcast or local distribution refers to a distribution to a particular geographical area, and does not necessarily refer to any sizes of geographical regions. A live media event refers to any type of live (e.g., real-time or near real-time) content distribution event, and is not restricted to any particular type of distribution medium.

Figure 1:
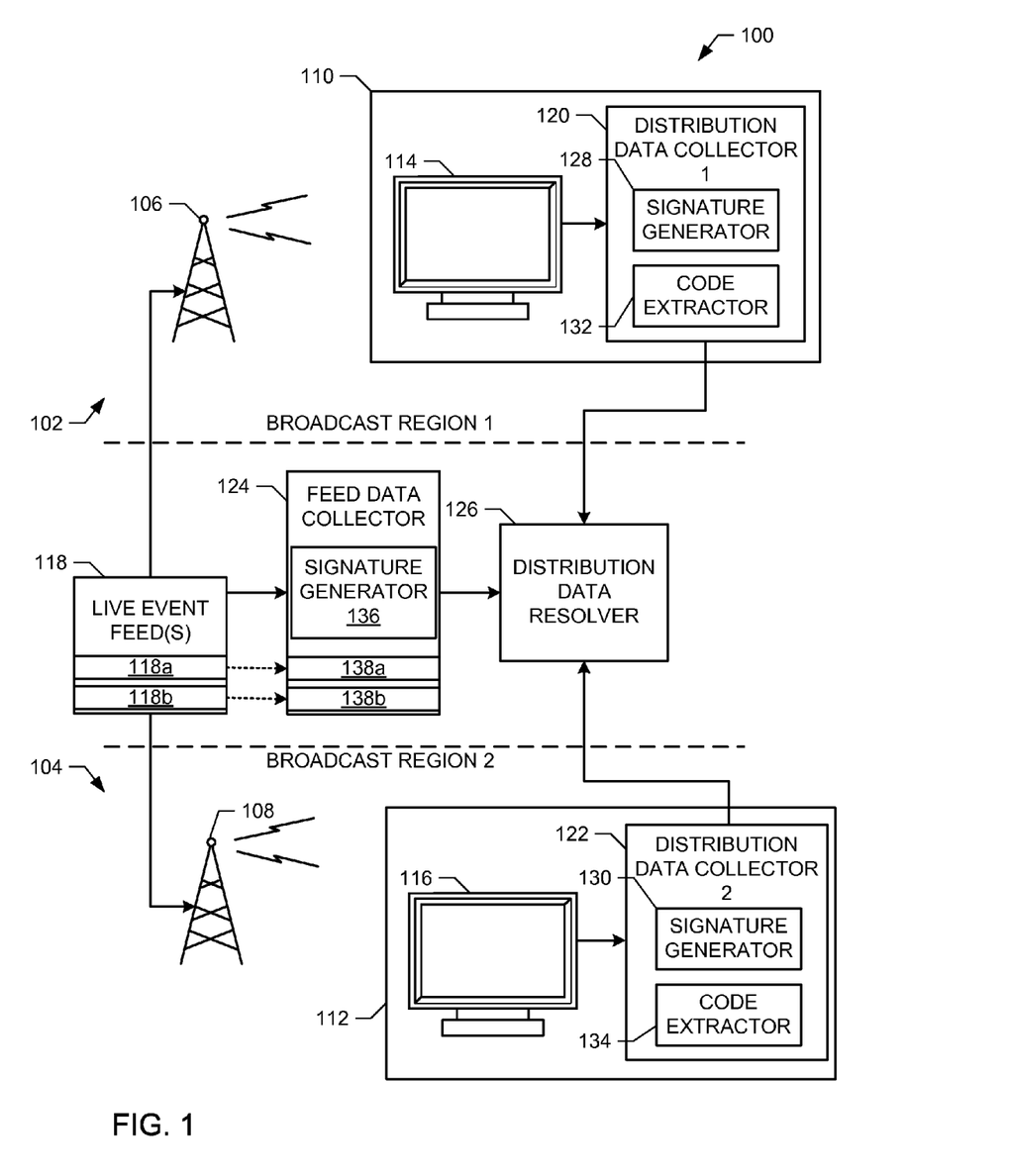
FIG. 1 is a block diagram of an example system to identify times at which live media events are distributed, constructed according to the teachings of this disclosure.

FIG. 1 is a block diagram of an example system 100 constructed in accordance with the teachings of this disclosure to identify times at which live media events are distributed. The example system 100 of FIG. 1 is implemented across multiple broadcast regions 102, 104. Each of the multiple broadcast regions 102, 104 includes one or more local or regional broadcast stations 106, 108 associated with the same (e.g., national, regional) network. The example regional broadcast stations 106, 108 have contractual rights to broadcast the same feed data and/or sets of feed data (e.g., sporting events, sets of sporting events, news events, etc.) to the respective broadcast regions 102, 104. The example regional broadcast stations 106, 108 may distribute programming (e.g., video and/or audio content such as television and/or radio broadcasts) and live media events to regional audiences via one or more of over-the-air broadcasting, cable delivery, satellite broadcasting, Internet delivery, and/or any other distribution media that may be used to deliver a event feed to audience members.

Each example broadcast region 102, 104 of FIG. 1 includes one or more media monitoring sites 110, 112. In some examples, the media monitoring sites 110, 112 may be substantially any location within a broadcast region 102, 104 capable of receiving content (e.g., television and/or radio signals, digital streaming, etc.), such as panelist households and/or non-panelist locations such as retail locations, commercial locations, cable television distributors, network affiliate broadcast sites, and/or any other non-panelist location. A panelist household is associated with audience measurement panelists statistically selected by an audience measurement service provider (such as The Nielsen Company, LLC). The example media monitoring sites 110, 112 include televisions 114, 116 (and/or tuning devices such as cable and/or satellite set top boxes, digital media devices, video game consoles, etc.) and/or other media presentation devices (e.g., computers with television tuners, cable and/or satellite set top boxes, digital media devices, radios, stereos, etc.) via which broadcasts from the regional broadcast stations 106, 108 may be tuned and/or presented.

The example regional broadcast stations 106, 108 are provided with live event feeds 118, from which the regional broadcast stations 106, 108 may select for distribution to the broadcast regions 102, 104 (e.g., to the media monitoring sites 110, 112). To identify which live media events in the live event feed(s) 118 are transmitted to the media monitoring sites 110, 112 in the different broadcast regions 102, 104, the example system 100 includes distribution data collectors 120, 122, a feed data collector 124, and a distribution data resolver 126.

The example distribution data collectors 120, 122 of FIG. 1 collect distribution data received and displayed on the example presentation devices (e.g., televisions) 114, 116. For example, the distribution data collectors 120, 122 collect data representative of the local broadcasts, such as one or more signatures of the audio and/or the video in the local broadcasts and/or codes or watermarks that are embedded in the audio and/or in the video. A signature is a descriptor that accurately characterizes signals for the purpose of matching, indexing, or database retrieval. A code or watermark is information embedded in or included with signals that, when decoded, conveys the information. Codes or watermarks are often embedded in a signal so as to be imperceptible to a human (e.g., an inaudible code or watermark embedded in an audio signal). Codes or watermarks may include metadata (e.g., data identifying the content and/or information associated with the content) that is contained within a data stream of the content. An example of metadata includes content identification data contained within a Motion Picture Experts Group (MPEG) digital data stream in private and/or user data fields.

The example distribution data collectors 120, 122 include respective signature generators 128, 130 and respective code extractors 132, 134. The example signature generators 128, 130 generate multiple signatures representative of the content presented by the presentation devices 114, 116 (e.g., content displayed on the televisions). These signatures may be compared to signatures generated from known content to match the displayed content to the known content. The example code extractors 132, 134 extract codes present in the audio content and/or from the video content presented by the presentation devices 114, 116 (e.g., content displayed by the televisions), where the codes have been previously inserted into and/or transmitted with the content to identify one or more of a station name, a broadcaster name, a content owner, or a program name.

The distribution data collectors 120, 122 transmit any generated signatures and/or extracted codes to the example distribution data resolver 126. For example, transmission may occur through a return path from the distribution data collectors 120, 122 via a data network, a cellular network, a telephony network, and/or any other return path.

The example feed data collector 124 of FIG. 1 includes a signature generator 136. The feed data collector 124 monitors the live event feeds 118 and generates one or more signatures 138a, 138b (e.g., via the signature generator 136) corresponding to each different live event feed 118a, 118b. Any appropriate signaturing technique may be used to generate the example signatures 138a, 138b from the live event feeds 118a, 118b. The example feed data collector 124 is also provided with information identifying one or more of a station name, a distributor name, a content owner and/or a program name for each of the example feeds 118a, 118b. The feed data collector 124 provides the signatures 138a, 138b and the identifying information for the corresponding feeds 118a, 118b to the example distribution data resolver 126.

The example distribution data resolver 126 compares the distribution data (e.g., received from the distribution data collectors 120, 122) to the feed data (e.g., received from the feed data collector 124) to generate a list identifying times at which the live media events corresponding to the feeds 118a, 118b which were distributed via corresponding distributors. Using this information, an audience measurement system can accurately determine an audience for each of the live media events when, for example, one or more distributors (e.g., regional broadcast stations 106, 108) switches on-the-fly between live event feeds 118a, 118b. In some examples, the system 100 of FIG. 1 determines the audience for the live media events when one or more regional distributors 106, 108 temporarily and/or repeatedly switch between the live event feeds 118a, 118b (e.g., during switches between games in the NCAA men's' basketball tournament, between National Football League games, etc.). The example distribution data resolver 126 can automatically determine the distribution times for the distributions without requesting additional information from a distributor (e.g., without requesting information via manual processes on whether an on-the-fly switch or other change in distribution has occurred).

While the example of FIG. 1 illustrates the regional distributors 106, 108, the example regional distributors 106, 108 may be any type of content distribution medium. For example, the live event feed(s) 118 may additionally or alternatively be distributed via over-the-air broadcasting, cable delivery, satellite transmission, Internet delivery (e.g., digital streaming), and/or any other past, present, and/or future distribution media.

While only one feed data collector 124 is shown in the example of FIG. 1, multiple feed data collectors 124 may be employed. For example, feed data collectors 124 may be located in each "on site" truck uploading content from specific sites of sporting or other live events, at online streaming web servers, and/or any other locations from which feed data may be transmitted.

Figure 2:
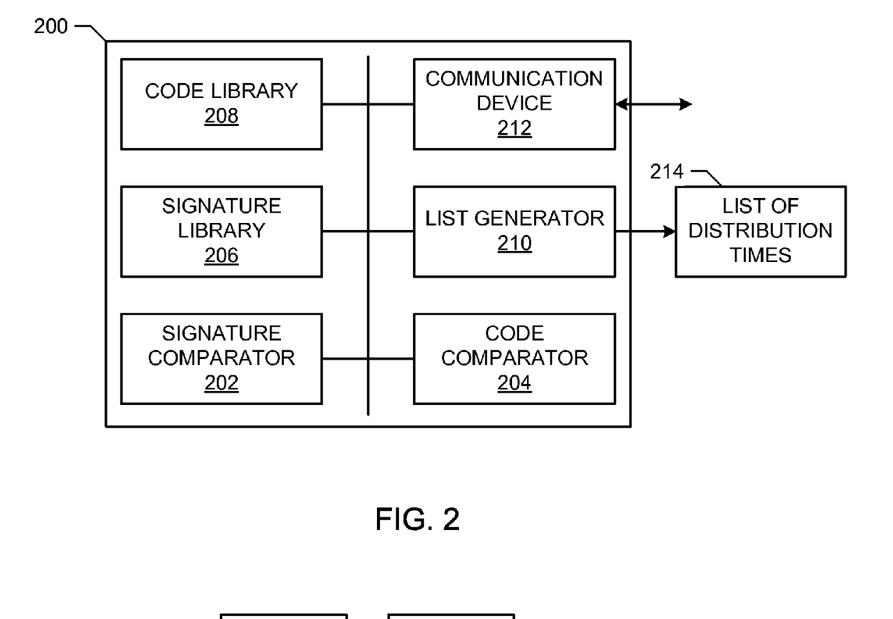
FIG. 2 is a block diagram of an example apparatus that may be used to implement the distribution data resolver of FIG. 1.

FIG. 2 is a block diagram of an example apparatus 200 that may be used to implement a distribution data resolver (e.g., the distribution data resolver 126 of FIG. 1) and/or may be used to compare distribution data (e.g., received from the distribution data collectors 120, 122 of FIG. 1) to the feed data (e.g., received from the feed data collector 124 of FIG. 1) to generate a list identifying times at which the live media events corresponding to the feeds 118a, 118b were distributed via corresponding distributors. The example apparatus 200 of FIG. 2 includes a signature comparator 202, a code comparator 204, a signature library 206, a code library 208, a list generator 210, and a communication device 212.

The example signature comparator 202 of FIG. 2 receives (e.g., via the communication device 212) distribution data including signatures of distributed content and feed data including signatures of live event feeds. In the example of FIG. 2, the distribution data and feed data received by the signature comparator 202 include signatures generated using the same or similar methods so that the signatures can be compared to determine whether the same content or portion (s) of the same content are represented by both compared signatures. For example, the signature comparator 202 may compare signatures generated using methods that generate signatures of portions of the content every few seconds, multiple times per second, multiple times per minute, and/or any other suitable time period. In some examples, the signature comparator 202 compares first sets of signatures of the content that are generated using a first method and compares second sets of signatures of the content that are generated using a second method. The signature comparator 202 may use multiple signature comparisons to, for example, increase confidence that the compared contents match.

If the signature comparator 202 determines that the signatures match, the signature comparator 202 stores information regarding the match in the list generator 210. Example information that may be stored in the list generator 210 includes a timestamp of the content presentation (obtained from, for example, the distribution data and/or the feed data or from a clock coupled to the computer), identifying information about the content (e.g., a name of the live media event), a network name, a network identifier, a distribution region, a distributor name, a station name, an owner of the live media event content, and/or any other identifying and/or logging information.

In some examples, signatures for the distribution data and/or signatures for the feed data are stored in the signature library 206 as they are received. The signature library 206 maps signatures to information associated with the content, such as a timestamp of the content from which the signature was generated (obtained from, for example, the distribution data and/or the feed data), identifying information about the content (e.g., a name of the live media event), a distribution time/date, a network name, a network identifier, a distribution region, a distributor name, a station name, an owner of the live media event content, and/or any other identifying and/or logging information. The identifying information may be used to index the example signatures and/or may be retrieved and/or provided to the list generator 210, such as when a feed data signature matching a distribution data signature is found in the signature library and/or vice versa. In some such examples, the signature comparator 202 compares signatures received via distribution data to signatures previously received in feed data that has been stored in the signature library 206 to attempt to find a matching signature.

The example code comparator 204 of FIG. 2 receives the distribution data (e.g., from the distribution data collectors 120, 122 of FIG. 1) and attempts to identify one or more codes present in the distribution data. For example, the distribution data collectors 120, 122 of FIG. 1 extract codes or watermarks (if any) embedded in the example content displayed by the respective information presentation devices (e.g., televisions 114, 116). Some such codes and/or watermarks may provide identifying information regarding the content, such as a distributor name, a network name, a content identification (e.g., a program name), a timestamp (e.g., a date and/or time of day) and/or other information. The example distribution data collectors 120, 122 transmit the codes and/or watermarks to the distribution data resolver 126 of FIG. 1 (e.g., at the code comparator 204). The code comparator 204 determines whether the codes and/or watermarks match known codes and/or watermarks (e.g., in the code library 208).

The example code library 208 of FIG. 2 maps codes and/or watermarks to pre-determined information associated with live media events, such as one or more of a station name, a broadcaster or distributor name, a content owner, a program name, and/or any other information associated with a live media event. For example, the code library 208 may store newly-generated codes and the information corresponding to the codes. Thus, when the example code comparator 204 receives a code or a watermark in distributed information, the code comparator 204 determines whether the code or watermark matches any of the codes or watermarks stored in the example code library 208. In some examples, the code library 208 receives codes embedded into feeds for live media events from the feed data collector 124 of FIG. 1. In some examples, the codes are an agreed station identifier and a time/date stamp, thereby automatically mapping content to a distributor and time of distribution.

If a code present in the distribution data matches a code in the library 208, the example code comparator 204 provides the code, information stored in the code library 208 that corresponds to the code, and/or other identifying information for the distribution, such as a timestamp of the content presentation (obtained from, for example, the distribution data, the code, and/or the feed data), identifying information about the content (e.g., a name of the live media event), a network name, a network identifier, a distribution region, a distributor name, a station name, an owner of the live media event content, a distributor, and/or any other identifying and/or logging information.

The example list generator 210 of FIG. 2 receives information corresponding to matching signatures and/or corresponding to identified codes and generates a list that identifies times at which the live media events were distributed via a corresponding distribution. In some examples, the list includes information representative of events, such as when a regional distributor 106, 108 starts distributing a first live event feed, ends distribution of a first live event feed, changes from distributing the first live event feed to distributing a second live event feed (e.g., scheduled and/or on-the-fly), and/or any other information relevant to identifying times and/or regions at which live events are distributed. In some examples, either the first live event feed or the second live event feed may be replaced by a non-live feed (e.g., a recorded program) and/or by a delayed feed (e.g., a nearly-live feed that is recorded and time shifted). The information in the list generated by the example list generator 210 advantageously provides detailed information about the live media events provided to an audience without manually revising a distribution schedule. Thus, if a distributor (e.g., television broadcaster) in the broadcast region 104 of FIG. 1 presents the Northwestern University basketball team playing the University of Illinois from 7:30 P.M. to 8:02 P.M., switches to distributing a game between the University of Wisconsin and Marquette University at 8:02 P.M. until 8:04 P.M. and then, at 8:04 P.M., returns to the Northwestern game, the example system of FIGS. 1 and/or 2 will detect and record the presentation of the two different games on the same distribution channel without manual intervention. As a result, audience allocation to specific events (e.g., the Northwestern game versus the Wisconsin game) can be performed efficiently and accurately.

The example communication device 212 communicates with external devices (e.g., the feed data collector 124, the distribution data collectors 120, 122, etc.). For example, the communications device 212 may include any type(s) of wired or wireless electronic communications interface, such as WiMax, Wifi, Ethernet, cellular radio, and/or any other past, present, or future communications technology.

Figure 3A:
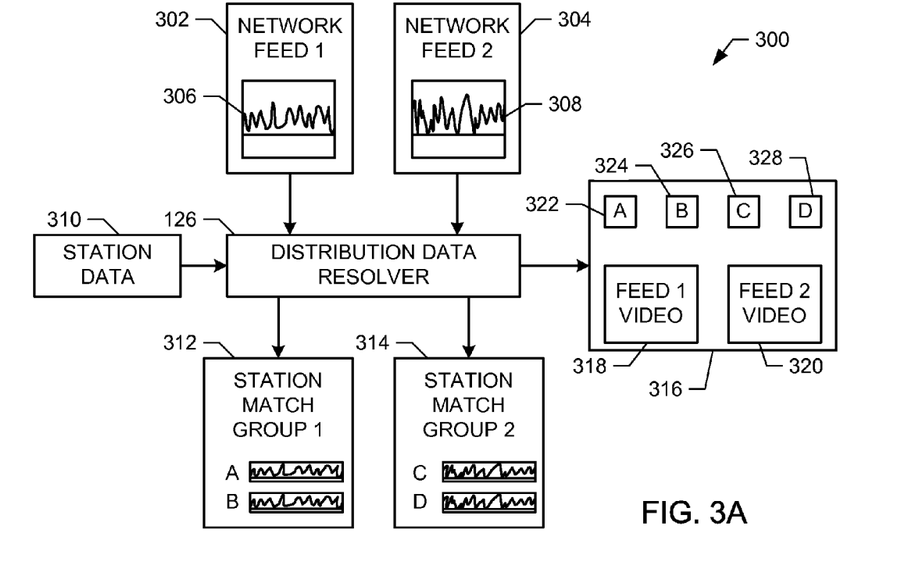
FIGS. 3A-3C illustrate an example process that may be performed by the system of FIG. 1 to identify times at which live media events are distributed.
Figure 3B:
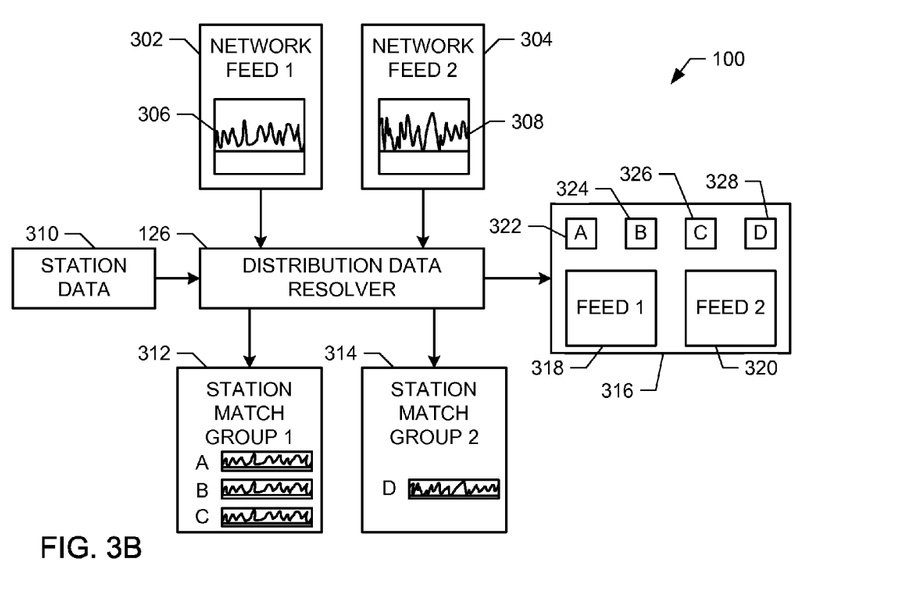
Figure 3C:
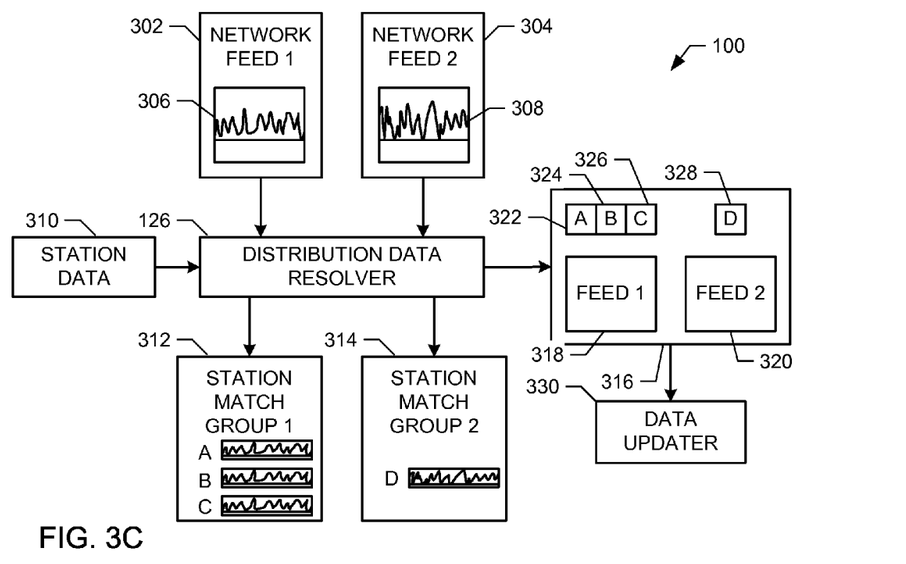

FIGS. 3A-3C illustrate an example system 300 to perform a process to identify times at which live media events are distributed (e.g., via one or more distributors, in one or more broadcast regions such as the broadcast regions 102, 104 of FIG. 1, etc.).

FIG. 3A illustrates an example system 300 in which several broadcast stations A, B, C, and D are each distributing one of multiple different network feeds 302, 304 (e.g., live media events). In the example of FIG. 3A, broadcast stations A, B are distributing the first network feed 302 and broadcast stations C, D are distributing the second network feed 304. The distribution data resolver 126 of FIG. 1 receives the network feeds 306, 308 (e.g., feed data representative of the network feeds 306, 308). The distribution data resolver 126 also receives station data 310 representative of scheduled broadcasts by the stations A, B, C, D (e.g., distribution data from distribution data collectors).

Based on the station data 310, the example distribution data resolver 126 compares the network feeds 302, 304 to the station data 310 to determine which of the network feeds 302, 304 are being broadcast by each of the example stations A, B, C, D. In the example of FIG. 3A, the network feeds 302, 304 are represented by one or more signatures 306, 308 of the content of the network feeds 302, 304.

Based on the determination of which of the stations A, B, C, D are distributing each network feed 302, 304, the example distribution data resolver 126 sorts the stations A, B, C, D into different station match groups 312, 314. The stations A, B in the first match group 312 are determined to be distributing the network feed 302 based on the station data 310 and/or the signatures 306. Similarly, the stations C, D in the second match group 312 are determined to be distributing the network feed 304 based on the station data 310 and/or the signatures 308.

The example distribution data resolver 126 provides the station match groups 312, 314 and/or other live media event information to a monitor 316. The monitor 316 may be viewed by a person monitoring the live media events and the stations showing each of the live media events. The monitor 316 displays content (e.g., video) 318, 320 of the network feeds 302, 304 (e.g., content from the network feeds 302, 304) in respective locations on the monitor 316. The example monitor 316 further displays which of the example stations A, B, C, and D are displaying each of the network feeds 302, 304. In the example of FIGS. 3A-3C, the monitor 316 arranges the displays of the stations to group the station content by the feed being broadcast. Thus, the example monitor 316 displays content (e.g., video) 322, 324, 326, 328 of the respective feeds 302, 304 being broadcast by each of the example stations A, B, C, D in association with labels and/or locations allocated to particular ones of the stations A, B, C, or D. In the example of FIG. 3A, the content 322, 324 for stations A, B is positioned near the content 318 and the content 326, 328 for stations C, D is positioned near the content 320.

FIG. 3B illustrates the example system 300 at a second time later than the time illustrated in FIG. 3A. In FIG. 3B, the distribution data resolver 126 has determined that the live media event broadcast by station C no longer matches the station match group 314 and/or the live media event broadcast by station D in the station match group 314. For example, the signature comparator 202 of FIG. 2 may fail to match signatures of the distribution data associated with station C with signatures of distribution data associated with station D and/or fails to match the signatures 308 for the network feed 304. In this example, the distribution data associated with the stations C, D are generated by respective distribution data collectors that are in the same broadcast regions as the respective stations C, D.

In response to determining that station C no longer matches the station match group 314, the example distribution data resolver 126 (e.g., via the signature comparator 202) determines whether the station C matches any other station match group (e.g., the station match group 312). In the example of FIG. 3A, the station C has switched on-the-fly to the network feed 302. As a result, the example distribution data resolver 126 determines that the station C matches one or both of the stations A, B in the station match group 312.

FIG. 3C illustrates the example system 300 at a third time after the second time of FIG. 3B. In the example of FIG. 3C, the distribution data resolver 126 provides the updated station match group information to the example monitor 316. In response, the monitor 316 displays the station C to display content 326 for the feed 302 and changes the position of the content 326 corresponding to Station C to be near the corresponding content 318.

Additionally, the example monitor 316 and/or the example distribution data resolver 126 notifies a data updater 330 to update data for the station C. For example, when the data updater 330 is notified as to the update, the data updater 330 may update a distribution or audience measurement record to reflect the change from the feed 304 to the feed 302 by station C. Accordingly, the example system 300 may be advantageously used to automatically notify and/or update distribution and/or audience measurement records to reflect on-the-fly changes to distribution of live media events.

While example manners of implementing the distribution data collectors 120, 122, the feed data collector 124, and the distribution data resolver 126 of FIG. 1 have been illustrated in FIGS. 2 and 3A-3C, one or more of the elements, processes and/or devices illustrated in FIGS. 1, 2, and 3A-3C may be combined, divided, re-arranged, omitted, eliminated and/or implemented in any other way. Further, the feed data collector 124, the distribution data collectors 120, 122, the signature generators 128, 130, 136, the code extractors 132, 134, the signature comparator 202, the code comparator 204, the signature library 206, the code library 208, the list generator 210, the communication device 212, the distribution data resolver 126, and/or the apparatus 200, the data updater 330 and/or, more generally, the example distribution data resolver 126 and/or the example apparatus 200 of FIGS. 1, 2, and 3A-3C may be implemented by hardware, software, firmware and/or any combination of hardware, software and/or firmware. Thus, for example, any of the feed data collector 124, the distribution data collectors 120, 122, the signature generators 128, 130, 136, the code extractors 132, 134, the signature comparator 202, the code comparator 204, the signature library 206, the code library 208, the list generator 210, the communication device 212, the distribution data resolver 126, and/or the apparatus 200, the data updater 330 and/or, more generally, the example distribution data resolver 126 and/or the example apparatus 200 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the feed data collector 124, the distribution data collectors 120, 122, the signature generators 128, 130, 125, the code extractors 132, 134, the signature comparator 202, the code comparator 204, the signature library 206, the code library 208, the list generator 210, the communication device 212, the distribution data resolver 126, and/or the apparatus 200, and/or the data updater 330 hereby expressly defined to include a tangible computer readable medium such as a memory, DVD, CD, Blu-ray, etc. storing the software and/or firmware. Further still, the example distribution data resolver 126 and/or the apparatus 200 of FIGS. 1 and 2 may include one or more elements, processes and/or devices in addition to, or instead of, those illustrated in FIGS. 1 and 2, and/or may include more than one of any or all of the illustrated elements, processes and devices.

Flowcharts representative of example machine readable instructions for implementing the distribution data collectors 120, 122, the feed data collector 124, and the distribution data resolver 126 of FIG. 1 are shown in FIGS. 4-7. In this example, the machine readable instructions comprise one or more programs for execution by a processor such as the processor 912 shown in the example processor platform 900 discussed below in connection with FIG. 9. The programs may be embodied in software stored on tangible computer readable media such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowcharts illustrated in FIGS. 4-7, many other methods of implementing the example distribution data collectors 120, 122, the example feed data collector 124, and/or the example distribution data resolver 126 may alternatively be used. For example, the order of execution of the blocks may be changed, and/or some of the blocks described may be changed, eliminated, or combined.

As mentioned above, any of the example processes of FIGS. 4-7 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4-7 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 4:
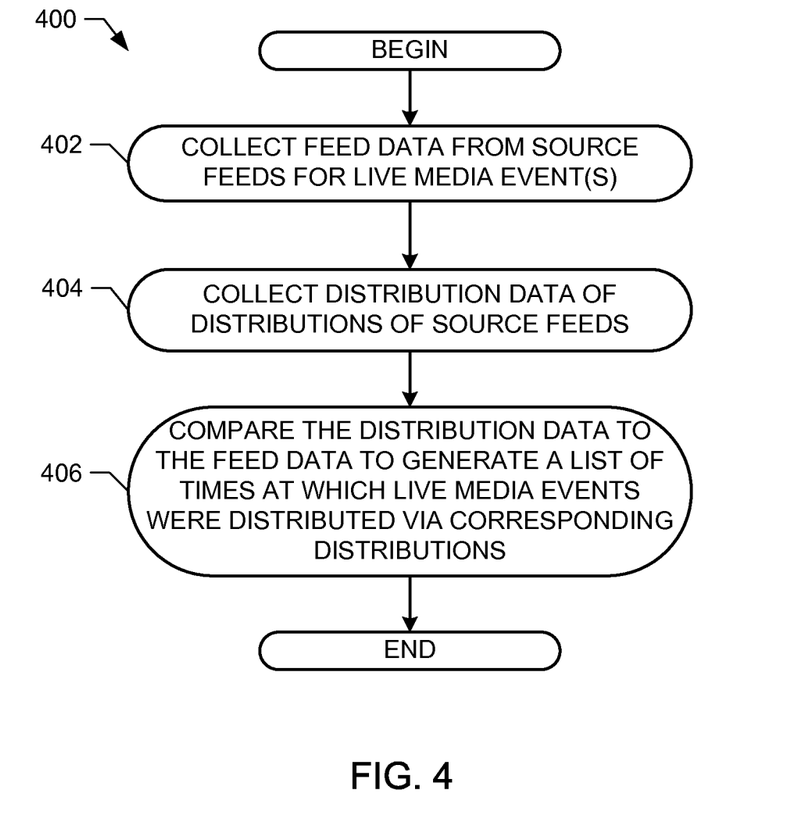
FIG. 4 is a flowchart representative of example machine readable instructions which may be executed by a logic circuit to identify times at which live media events are distributed.

The program of FIG. 4 begins at block 402, in which a feed data collector (e.g., the feed data collector 124 of FIG. 1) collects feed data from source feeds for live media event(s). For example, the feed data may include collecting signatures and/or embedded codes from an audio and/or video content feed. An example method to implement block 402 and/or the feed data collector 124 is described below and illustrated in FIG. 5.

The example method 400 of FIG. 4 collects distribution data of distributions of source feeds (e.g., via the distribution data collectors 120, 122 of FIG. 1) (block 404). For example, the distribution data collectors 120, 122 of FIG. 1 generate signatures and extract embedded codes from content that is presented via respective presentation devices. The distribution data collectors 120, 122 may be associated with media monitoring sites 110, 112 (e.g., panelist households, locations not associated with panelist households). The data collectors 120, 122 are located in different broadcast regions 102, 104 (e.g., different geographical areas). Thus, the example distribution data collectors 120, 122 may tune into the same network of channels but may receive different content based on which of a plurality of live event feeds is being distributed via a respective distributor (e.g., in a respective broadcast region 102, 104). An example method to implement block 404 and/or the distribution data collectors 120, 122 is described below and illustrated in FIG. 6.

The example distribution data resolver 126 compares the collected distribution data to the collected feed data to generate a list of times at which the live media events were distributed via corresponding distributions (block 406). For example, the distribution data resolver 126 of FIG. 1 receives the collected feed data from the feed data collector 124 and the collected distribution data from the distribution data collectors 120, 122, and determines which of multiple feeds 138a, 138b were transmitted via each of respective distributors. An example method to implement block 406 and/or the distribution data resolver 126 is described below and illustrated in FIG. 6.

The example method 400 may then end and/or iterate to continue identifying what times event feeds are distributed.

Figure 5:
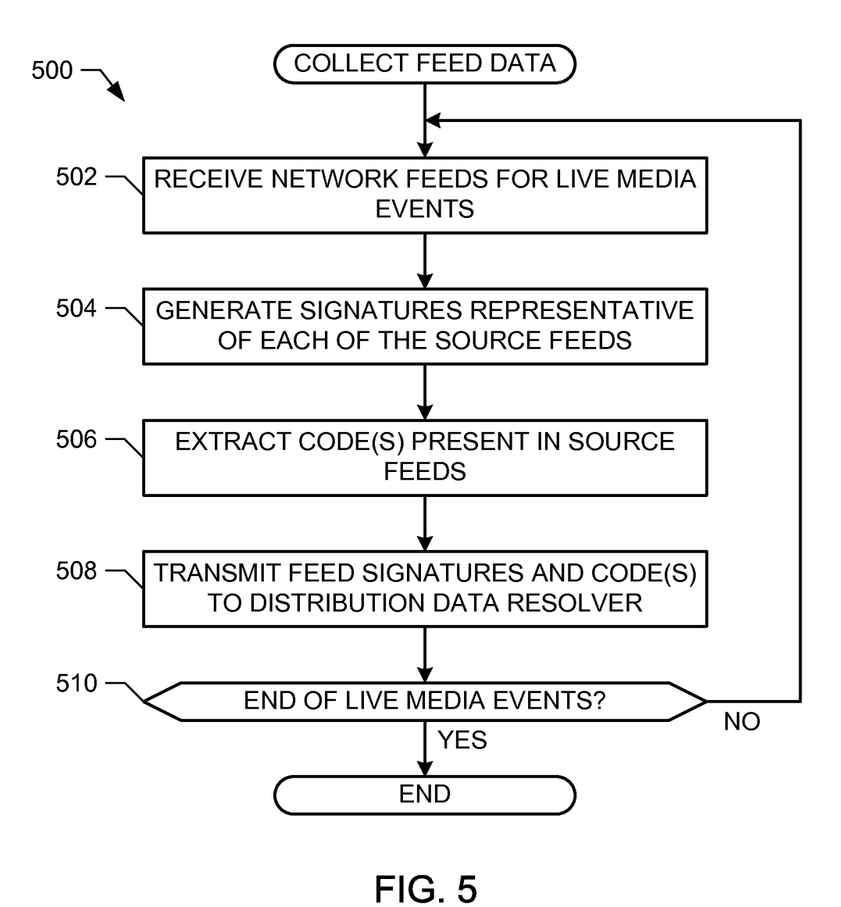
FIG. 5 is a flowchart representative of example machine readable instructions which may be executed by a logic circuit to collect feed data for live media events.
Figure 9:
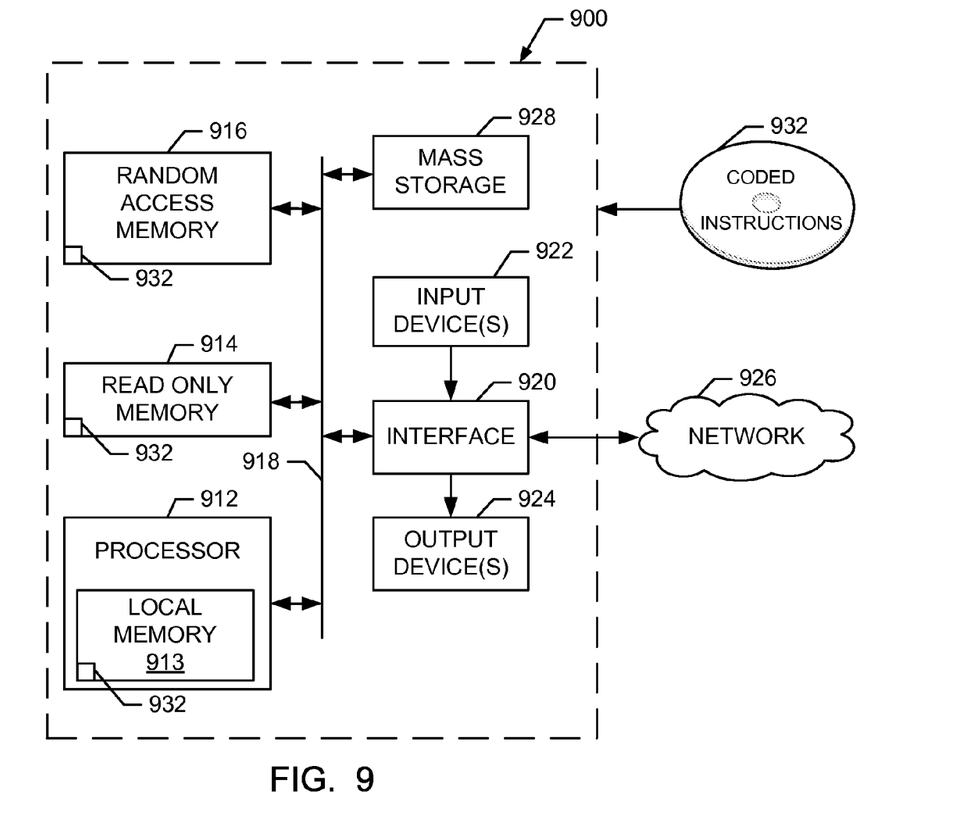
FIG. 9 is a block diagram of an example processor platform capable of executing the instructions of FIGS. 4, 5, 6, and/or 7 to implement the systems and apparatus of FIGS. 1, 2, 3A-3C, and/or 8.

FIG. 5 is a flowchart representative of example machine readable instructions 500 which may be executed by a logic circuit such as the processor 912 of FIG. 9 to collect feed data for live media events. The example instructions 500 may be executed to implement the example feed data collector 124 and/or the example signature generator 136 of FIG. 1.

The method 500 of FIG. 5 begins by receiving (e.g., at the feed data collector 124 of FIG. 1) network feeds for multiple live media events (block 502). For example, the feed data collector 124 of FIG. 1 receives feeds 118a, 118b from a source of live event feeds 118, such as recordings of multiple, concurrent sporting events.

The example feed data collector 124 generates signatures 138a, 138b representative of each of the network feeds 118a, 118b (e.g., via the signature generator 136) (block 504). The signatures generated by the example signature generator 136 are representative of blocks of audio, video, and/or both audio and video in the network feed 118a, 118b for which the signatures are generated. In some examples, the generated signatures represent overlapping blocks of audio and/or video.

The example feed data collector 124 further extracts codes that are present in the source feeds (e.g., live event feeds 118a, 118b) (block 506). For example, inaudible or substantially inaudible codes (e.g., audio-masked codes or watermarks) may be embedded into the live event feeds 118a, 118b to provide information to an audience measurement device or system measure an audience of television programs, movies, games, and/or any other types of media being watched by an audience. These codes can provide, for example, information identifying the program or content being presented, the channel on which it is presented, timestamp information, ownership information, and/or other types of information. The example feed data collector 124 extracts the codes and/or watermarks to determine the codes present in the event feeds. To perform the detection, the example feed data collector 124 is provided with one or more decoders to perform one or more procedures to detect codes in the source feeds (e.g., the live event feeds 118a, 118b).

In some other examples, the feed data collector 124 and/or the distribution data resolver 126 of FIG. 1 are provided with a priori knowledge of the codes and/or watermarks to be present in the network feeds 118a, 118b. In these examples, the feed data collector 124 does not attempt to extract codes or watermarks from the feeds 118a, 118b and block 506 may be omitted.

The example feed data collector 124 of FIG. 1 transmits generated feed signatures and any extracted code(s) to a distribution data resolver, such as the distribution data resolver 126 of FIG. 1 (block 508). For example, the feed data collector 124 may communicate with the example distribution data resolver 126 via a network such as the Internet or a local area network (LAN).

The example feed data collector 124 determines if the ends of the live media events has been reached (block 510). If one or more of the live media events are continuing (block 510), the example feed data collector 124 returns to block 502 to continue collecting feed data.

In some examples, one or more of the blocks 502-510 are run simultaneously or substantially simultaneously on sequential blocks of data. For example, a first block of audio and video received on a first network feed 118a is received (block 502). Signatures of the first block are then generated at block 504. While block 504 is being performed on the first block, a second block of audio and video may be received at block 502. Thus, blocks 502-506 may operate on 2 or more blocks of audio and video substantially simultaneously, while block 508 is performed on signatures and code(s) for yet another block of data. In other words, multiple instances of the blocks executing, for instance, in parallel processing threads may exist.

Figure 6:
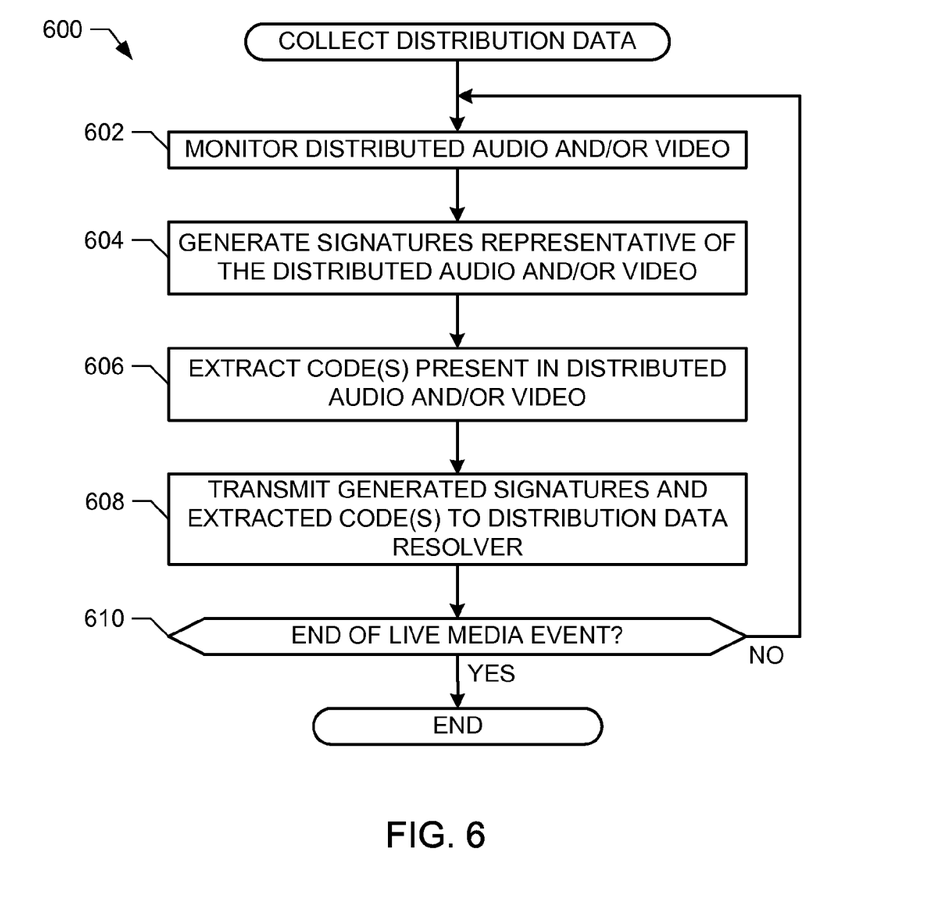
FIG. 6 is a flowchart representative of example machine readable instructions which may be executed by a logic circuit to collect distribution data.

FIG. 6 is a flowchart representative of example machine readable instructions 600 which may be executed by a logic circuit to collect distribution data. The example instructions 600 may be executed to implement the example distribution data collectors 120, 122, the example signature generators 128, 130, and/or the example code extractors 132, 134 or FIG. 1.

The instructions 600 of FIG. 6 being by monitoring distributed audio and/or video (block 602). For example, monitoring distributed audio may include receiving analog and/or digital audio and/or video signals that are output from a television or other media presentation device (e.g., the televisions 114, 116 of FIG. 1) tuned to (e.g., in the same location as, receiving streaming data from, etc.) the distribution data collector 120, 122. In some examples, such analog and/or digital audio and/or video signals may be collected (e.g., from a set top box or other signal receiver) even when the television is not actually displaying the video and/or playing the audio (e.g., when the television is off or in a muted state). In some other examples, the distribution data collector 120, 122 includes a microphone to collect audio actually output from a television or other presentation device so muting would interfere with the data collection.

The example instructions 600 generate signatures (e.g., via the signature generator 128, 130) representative of the distributed audio and/or video (e.g., video played via a media presentation device) (block 604). For example, the signature generators 128, 130 may be configured to generate the same and/or compatible types of signatures (e.g., signatures generated using the same methods) as the signature generator 136. Thus, the signatures generated from the network feeds 118a, 118b and signatures generated from the distributed audio and/or video will result in matching signatures for corresponding (e.g., same or similar) blocks of audio and/or video.

The example instructions 600 also extract (e.g., via the code extractors 132, 134) code(s) (if present) from the audio and/or video (block 606). For example, the code extractors 132, 134 may determine whether codes or watermarks are embedded in the distributed audio and/or video. If codes or watermarks are recognized, the example code extractors 132, 134 extract and log the codes to be sent to the distribution data resolver 126.

The example distribution data collector 120, 122 transmits the signatures and extracted codes to a distribution data resolver (e.g., the distribution data resolver 126 of FIG. 1) (block 608). For example, the distribution data collector 120, 122 may transmit signatures generated by the signature generator 128, 130 and codes extracted by the code extractor 132, 134 periodically, aperiodically, on request by the distribution data resolver 126, and/or whenever a signature is generated and/or a code extracted, for the duration of a live media event. For example, the distribution data collector 120, 122 may store signatures and codes and transmit stored signatures and codes every few minutes during the live media event. If the distribution data collector 120, 122 does not transmit the information often enough, the distribution data resolver 126 may not determine which network feeds 118a, 118b are being distributed via each distributor with sufficient precision or accuracy.

The example distribution data collector 120, 122 determines whether the end of the live media event has been reached (block 610). For example, the distribution data collector 120, 122 may identify an end code embedded in the distributed audio and/or video, receive a notification from the distribution data resolver 126, and/or otherwise determine that the live media event has ended. If the event has not ended (block 610), control returns to block 602 to continue monitoring the distributed audio and/or video. If, on the other hand, the live media event has ended (block 610), the example instructions 600 of FIG. 6 may end and/or iterate for another live media event.

Figure 7:
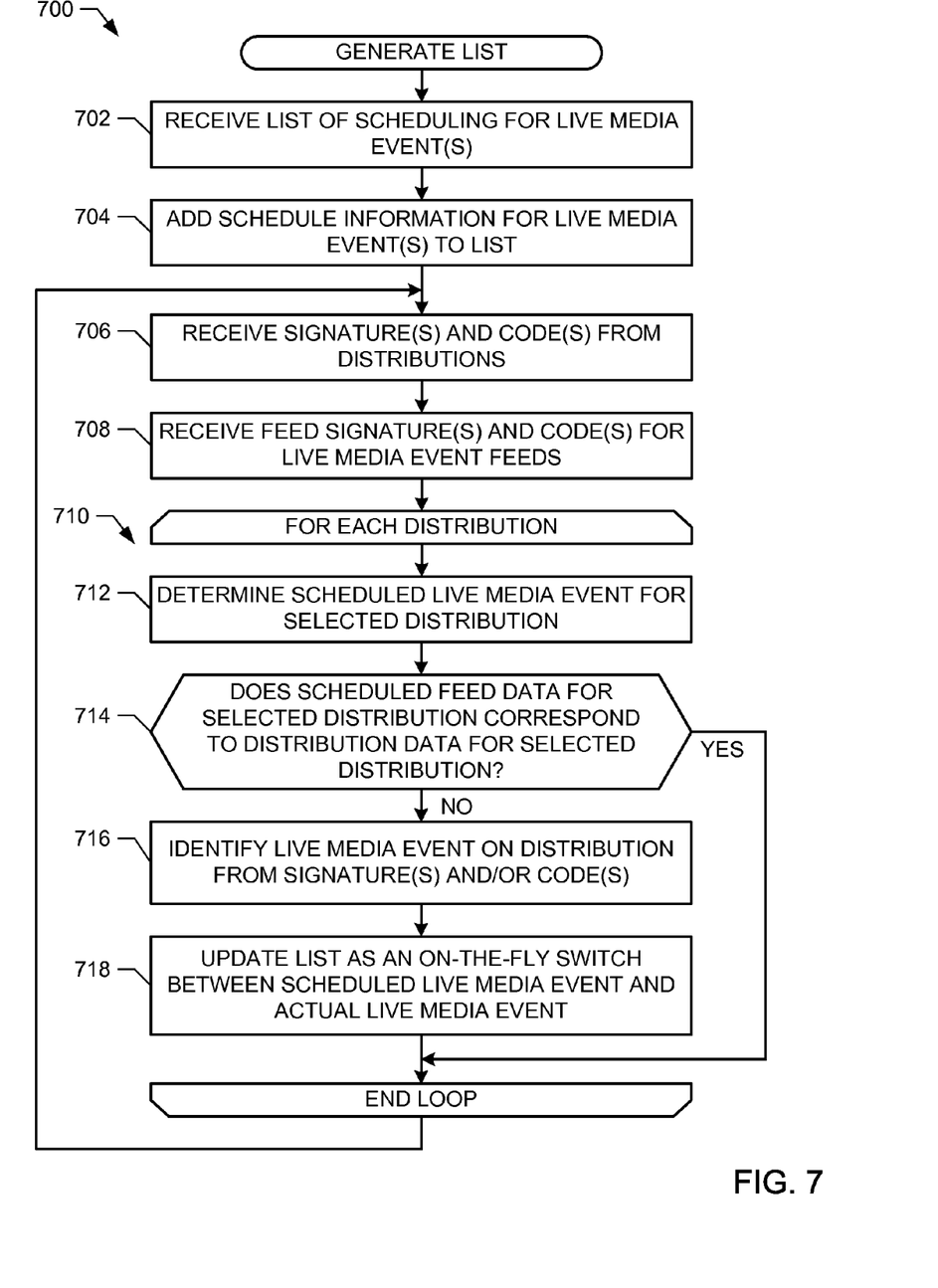
FIG. 7 is a flowchart representative of example machine readable instructions which may be executed by a logic circuit to generate a list of times at which live media events were distributed.

FIG. 7 is a flowchart representative of example machine readable instructions 700 which may be executed by a logic circuit to generate a list of times at which live media events were distributed. The example instructions 700 may be executed to implement the example distribution data resolver 126 of FIG. 1 and/or the example apparatus 200 of FIG. 2. For ease of discussion, the example instructions of FIG. 7 will be discussed below with reference to the example apparatus 200 to implement the example distribution data resolver 126 in the example system 100 of FIG. 1.

The example apparatus 200 receives a list of scheduling for live media events (block 702). For example, the apparatus 200 may receive the list of scheduling via the communication device 212. The list of scheduling includes anticipated distributors and/or distributions (e.g., broadcast areas 102, 104) and corresponding times that the distributors are to show particular source feeds, and may include codes to be embedded in network feeds of the live media events to be stored in the code library 208, provided to the code comparator 204, and/or provided to the list generator 210.

The example list generator 210 adds the scheduling in the received list of scheduling to the example list of distribution times 214 (block 704). In some examples, the list generator 210 generates a tentative or preliminary list of distribution times prior to generating a final list of distribution times. The preliminary list may then be modified prior to generating and/or outputting a final list of distribution times.

The example apparatus 200 receives (e.g., via the communications device 212, the signature comparator 202, and/or the code comparator 204) receives signature(s) and code(s) from multiple distributions (e.g., different broadcast regions 102, 104 of FIG. 1, different streaming sources, etc.) (block 706). For example, the apparatus 200 may receive signature(s) and/or code(s) from distribution data collectors 120, 122 located in different broadcast areas 102, 104. The signature(s) are generated by the distribution data collectors 120, 122 and the code(s) are extracted by the distribution data collectors 120, 122 based on which of multiple live media events are being distributed via the respective distributor.

The example apparatus 200 receives feed signature(s) and code(s) for live media event feeds (e.g., via the communications device 212, the signature comparator 202, and/or the code comparator 204) (block 708). For example, the apparatus 200 may receive signature(s) and/or code(s) for multiple network feeds 118*a*, 118*b* from the example feed data collector 124 of FIG. 1. The signatures are generated by the feed data collector 124 and the codes are extracted by the feed data collector 124 from the network feeds 118*a*, 118*b*.

The example instructions 700 enter a for-loop 710 to process data for each of the distributions to be measured (e.g., broadcast areas 102, 104). In each iteration of the example loop 710, the apparatus 200 selects one of the distributions. When the data from each of the distributions has been processed using the loop 710, the example loop 710 may end.

The apparatus 200 determines a scheduled live media event for the selected distribution (block 712). For example, the signature comparator 202 or the code comparator 204 may select one of the distributions, and determine (e.g., from the schedule information) which of multiple source feeds or live media events is scheduled to be distributed via the selected distribution. The example apparatus 200 then determines whether the scheduled feed for the distribution area corresponds to the distribution data for the selected distribution area (block 714).

For example, the signature comparator 202 may determine whether one or more signature(s) received from the distribution data collector 120 in the distribution matches one or more signature(s) for the source feed 118*a* scheduled to be distributed (e.g., broadcast) in the broadcast area 102. Additionally or alternatively, the example code comparator 204 may determine whether one or more codes received from the distribution data collector 120 in the broadcast area 102 matches one or more code(s) for the network feed 118*a* scheduled to be distributed in the broadcast area 102. In some examples, signatures and/or codes for advertisement periods are excluded and/or at least a threshold number of signatures and/or codes must match before the apparatus 200 determines that the scheduled feed data corresponds to the distribution data.

If the scheduled feed data does not correspond to the distribution data (block 714), the example apparatus 200 identifies which live network event is distributed via the selected distribution from the signature(s) and/or the code(s) (block 716). For example, the signature comparator 202 may compare the signatures (received from distribution data collectors 120, 122 in the selected broadcast area 102, 104) to signatures stored in the signature library 206 for the available network feed(s). The example list generator 210 updates the list as an on-the-fly switch between a scheduled live media event and the actual, detected live media event (block 718).

If the scheduled feed data corresponds to (e.g., represents the same audio and/or video information as) the distribution data for the selected distribution (block 714), the example instructions 700 skip blocks 716 and 718, and selected a next distribution (if any remain to be processed).

Figure 8:
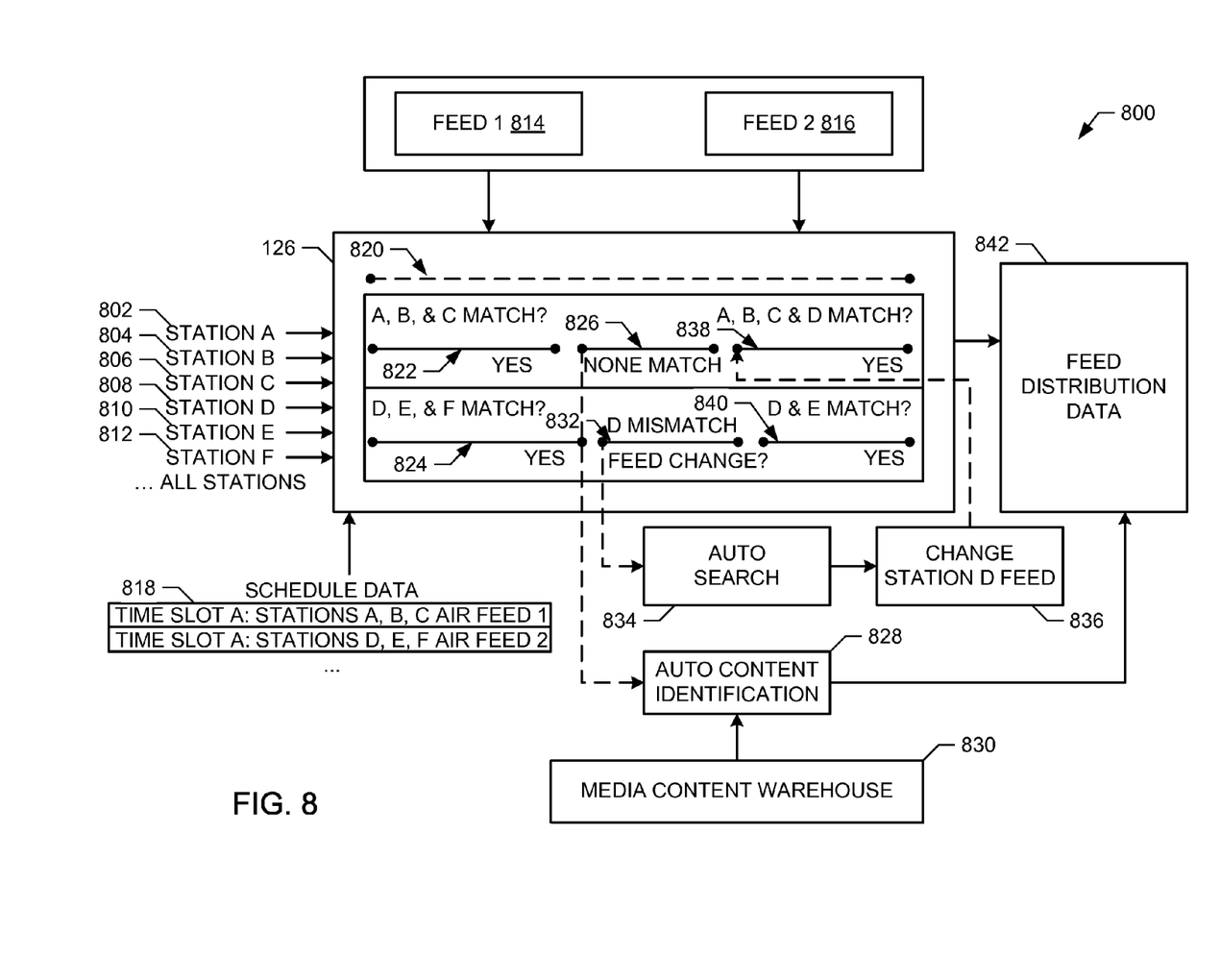
FIG. 8 illustrates an example process to identify times at which multiple live network events are distributed via respective distributions.

FIG. 8 illustrates an example process 800 to identify times at which multiple live media events are distributed via respective distributions. The example process 800 illustrated in FIG. 8 may be used in addition or as an alternative to the example processes described with reference to FIGS. 4-7. The example process 800 is implemented using the example distribution data resolver 126 of FIG. 1.

In the example process 800 of FIG. 8, the distribution data resolver 126 receives a plurality of broadcast stations A-F 802-812 corresponding to the same network (e.g., a television network that may show any of the same set of live media events). In some examples, the distribution data resolver 126 receives signatures of the audio and video distributed by the respective broadcast stations A-F 802-812.

The example distribution data resolver 126 further receives multiple network feeds 814, 816 representative of different live media events. Any combination of the feeds 814, 816 may be distributed by any combination of the stations A-F 802-812. In some examples, the distribution data resolver 126 receives signatures of the audio and video distributed by the respective broadcast stations A-F 802-812.

The example distribution data resolver 126 also receives schedule data 818. The example schedule data 818 of FIG. 8 represents that stations A, B, and C 802-806 are to distribute (e.g., broadcast, air) the first feed 814 and stations D, E, and F 808-812 are to distribute the second feed 816 during an event time period 820.

During the event time period 820, the example distribution data resolver 126 matches the broadcast stations A-F 802-812 to the feeds 814, 816 according to the live media event(s) being distributed on the respective stations A-F 802-812. For example, the distribution data resolver 126 may match signatures of the stations A-F 802-812 to signatures of the feeds 814, 816 to determine matches. In some examples, the distribution data resolver 126 attempts to match each station A-F 802-812 first based on the schedule data 818. In the example of FIG. 8, stations A, B, and C 802-806 match the first feed 814 during a first period 822 and the stations D, E, and F 808-812 match the second feed 816 during a second period 824. The first and second periods 822, 824 are sub-periods of the example event time period 820 and may be partially or completely overlapping.

During a third period 826 (e.g., a third sub-period of the event time period 820), the distribution data resolver 126 determines that none of the stations A, B, or C 802-806 match the first feed 814. This may occur, for example, when a break in the feed occurs (e.g., scheduled or unscheduled) in which each of the stations A, B, and C 802-806 is permitted to sell advertising time on their respective stations (in contrast to showing a national advertisement). In response, the distribution data resolver 126 invokes an automatic content identification process 828. The example automatic content identification process 828 may be performed by the distribution data resolver 126 and/or by a different entity (e.g., a different server, a different computer, etc.). The automatic content identification process 828 has access to a media content warehouse 830, which stores known content that can be used to identify unknown content via, for example, signature and/or code matching. In the example of FIG. 8, the media content warehouse 830 includes, among other things, signatures corresponding to known television commercials. The automatic content identification process 828 uses the signatures in the media content warehouse 830 to identify the content distributed by the stations A, B, and C 802-806 during the third time period 826.

At a fourth time period 832, the example distribution data resolver 126 determines that station D 808 no longer matches the second feed 816, while the stations E and F 810, 812 still match the second feed 816. In response, the example distribution data resolver 126 performs an automatic search process 834, in which the distribution data resolver 126 searches the feeds 814, 816 to determine which of the feeds 814, 816 is being distributed via the station D 808. In the example of FIG. 8, the automatic search process 834 determines that station D has changed feeds to the first feed 814. As a result, the distribution data resolver 126 records the change in the first feed 814 for station D 808 in block 836. Recording the change may include, for example, recording an on-the-fly change for the station D 808.

As a result of the change of station D 808 to the first feed 814, the distribution data resolver 126 determines that stations A, B, C, and D 802-808 match the first feed 814 during a fifth period 838. Additionally, the distribution data resolver 126 determines that stations E and F 810, 812 match the first feed 814 during a sixth period 840. The example periods 838, 840 run to the end of the example event time period 820.

The example distribution data resolver 126 outputs feed distribution data 842, which includes information representative of the matches between the stations A-F 802-812 and the feeds 814, 816. In the example of FIG. 8, the feed distribution data 842 includes the start times and the end times of the event time period 820 and the time periods 822, 824, 826, 832, 838, and 840. The example distribution data 842 further includes information representative of the on-the-fly switch identified by the automatic search process 834.

The time periods 822, 824, 826, 832, 838, and 842 of FIG. 8 are not necessarily drawn to scale. For example, the time periods 826 and/or 832 may be substantially shorter in length than the time periods 822, 824, 838, and/or 840. Further, the process 800 may include more or fewer time periods than the time periods 822, 824, 826, 832, 838, and 842, more or fewer stations than the stations A-F 802-812, and/or more or fewer feeds than the feeds 814, 816.

FIG. 9 is a block diagram of an example processor platform 900 capable of executing the instructions 400-700 of FIGS. 4-7 to implement the feed data collector 124, the distribution data collectors 120, 122, the signature generators 128, 130, 136, the code extractors 132, 134, the signature comparator 202, the code comparator 204, the signature library 206, the code library 208, the list generator 210, the communication device 212, the distribution data resolver 126, and/or the apparatus 200, the data updater 330, the automatic content identification process 828, and/or the automatic search process 834 of FIGS. 1, 2, 3A-3C, and 8. The processor platform 900 can be, for example, a server, a personal computer, a mobile phone (e.g., a cell phone), a personal digital assistant (PDA), an Internet appliance, a digital video recorder, a personal video recorder, a set top box, or any other type of computing device.

The system 900 of the instant example includes a processor 912. For example, the processor 912 can be implemented by one or more microprocessors, controllers, and/or logic circuits from any desired family or manufacturer.

The processor 912 includes a local memory 913 (e.g., a cache) and is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 also includes an interface circuit 920 (e.g., the communications device 212 of FIG. 2). The interface circuit 920 may be implemented by any type of interface standard, such as an Ethernet interface, a universal serial bus (USB), and/or a PCI express interface.

One or more input devices 922 are connected to the interface circuit 920. The input device(s) 922 permit a user to enter data and commands into the processor 912. The input device (s) can be implemented by, for example, a keyboard, a mouse, a touchscreen, a track-pad, a trackball, isopoint and/or a voice recognition system.

One or more output devices 924 are also connected to the interface circuit 920. The output devices 924 can be implemented, for example, by display devices (e.g., a liquid crystal display, a cathode ray tube display (CRT), a printer and/or speakers). The interface circuit 920, thus, typically includes a graphics driver card.

The interface circuit 920 also includes a communication device such as a modem or network interface card to facilitate exchange of data with external computers via a network 926 (e.g., an Ethernet connection, a digital subscriber line (DSL), a telephone line, coaxial cable, a cellular telephone system, etc.).

The processor platform 900 also includes one or more mass storage devices 928 for storing software and data. Examples of such mass storage devices 928 include floppy disk drives, hard drive disks, compact disk drives and digital versatile disk (DVD) drives. The mass storage device 928 may implement the signature library 206 and/or the code library 208 of FIG. 2.

The coded instructions 932 of FIGS. 4-7 may be stored in the mass storage device 928, in the volatile memory 914, in the non-volatile memory 916, and/or on a removable storage medium such as a CD or DVD.

From the foregoing, it will be appreciated that disclosed systems, methods, apparatus and articles of manufacture may be used to accurately and precisely identify times at which live media events are distributed. Example systems, methods, apparatus and articles of manufacture disclosed herein can automatically provide rapid results and updates regarding multiple distributions (e.g., multiple broadcast areas, multiple network feeds). Thus, the example systems, methods, apparatus and articles of manufacture can more rapidly and more efficiently credit live media events and advertisements, as well as leading and/or following programs or events, than known methods, particularly in the presence of on-the-fly transitions between two or more live events. Further, the example systems, methods, apparatus and articles of manufacture increase the efficiency with which such data is collected by reducing an amount of manual labor used to acquire the live media event information.

Example systems, methods, apparatus and articles of manufacture disclosed herein may be used to determine whether high-definition and standard-definition distributors (e.g., broadcasters) are simulcasting a live media event. For example, while a high-definition distributor and an associated standard-definition distributor in the same broadcast region usually broadcasts the same content (at different resolutions), systems, methods, apparatus and articles of manufacture may determine when a high-definition distributor is presenting a first live media event and a standard-definition distributor associated with the high-definition distributor is presenting a second, different live media event. Similarly, example systems, methods, apparatus and articles of manufacture may be used to determine whether local broadcast satellite offices (e.g., local affiliates) and a parent network are simulcasting a live media event. For example, systems, methods, apparatus and articles of manufacture may be used to detect when an affiliate is not presenting the same content that the parent network is providing to affiliates.

Systems, methods, apparatus and articles of manufacture may also be used to determine whether network feeds from geographically separate locations (e.g., an Eastern United States feed, a Western United States feed) are being properly monitored. For example, systems, methods, apparatus and articles of manufacture may be used to identify whether manual monitoring data for feeds in different geographical locations is consistent with actual presentation of feeds.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
    collecting feed data representative of a plurality of source feeds being provided to a distributor, the source feeds being associated with respective live media events;
    collecting distribution data, the distribution data being representative of a plurality of distributions of the source feeds by the distributor; and
    comparing, using a processor, the distribution data to the feed data to generate a list identifying an on-the-fly switch occurring on a single channel between a first one of the live media events and a second one of the live media events made by the distributor, the first live media event being a live media event scheduled to be transmitted by the distributor at a first time, and generating the list comprises logging that the second live media event is actually transmitted by the distributor at the first time.

2. A method as defined in claim 1, wherein the first live media event is a first sporting event and the second live media event is a second sporting event different from the first sporting event.

3. A method as defined in claim 1, wherein generating the list comprises comparing a code present in the feed data to a code present in the distribution data.

4. A method as defined in claim 3, wherein generating the list comprises comparing a first signature associated with the feed data to a second signature associated with the distribution data.

5. A method as defined in claim 3, wherein the code present in the distribution data is collected at a reference station not present in a panelist household.

6. A method as defined in claim 1, wherein generating the list comprises comparing a first signature associated with the feed data to a second signature associated with the distribution data.

7. A method as defined in claim 6, wherein the second signature associated with the distribution data is collected at a reference station not present in a panelist household.

8. A method as defined in claim 1, further comprising identifying the second live media event.

9. A method as defined in claim 8, wherein the list identifies the live media events by name.

10. A method as defined in claim 8, wherein identifying the second live media event comprises comparing a code present in the distribution data to a first library mapping codes to at least one of a station name, a distributor name, a content owner or a program name.

11. An apparatus, comprising:
    a comparator to compare distribution data to feed data, the distribution data being representative of media information received at a detection site and the feed data being representative of respective live media events being provided to a distributor via corresponding source feeds; and
    a list generator to generate a list identifying an on-the-fly switch occurring on a single channel between a first one of the live media events and a second one of the live media events at the distributor level, the first live media event being a live media event scheduled to be transmitted by the distributor at a first time, the list generator to generate the list by logging that the second live media event is actually transmitted by the distributor at the first time.

12. An apparatus as defined in claim 11, wherein the comparator comprises a signature comparator to compare the distribution data to a signature stored in a signature library, the signature being representative of one of the live media events.

13. An apparatus as defined in claim 11, wherein the distribution data and the feed data comprise signatures generated using at least one of audio signaturing or video signaturing.

14. An apparatus as defined in claim 11, wherein the comparator comprises a code comparator to identify at least one of a station name, a distributor name, a content owner or a program name.

15. An apparatus as defined in claim 14, further comprising a code library to map a plurality of codes to respective ones of the station name, the distributor name, the content owner or the program name.

16. An apparatus as defined in claim 11, wherein the list generator is to generate the list without requesting additional information from a source of the distribution data.

17. An apparatus as defined in claim 11, wherein the comparator is to identify a match between the distribution data and the feed data when at least a threshold number of distribution signatures collected from a media monitoring site correspond to feed signatures collected from an on-site location associated with one of the live media events.

18. An apparatus as defined in claim 11, wherein the distributor is associated with a first geographical region different than a second geographical region associated with a second distributor that receives the source feeds.

19. A tangible computer readable medium comprising computer readable instructions which, when executed, cause a processor to at least:
  access feed data representative of a plurality of source feeds being provided to a distributor, the source feeds being associated with respective live media events;
  access distribution data, the distribution data being representative of a plurality of distributions of the source feeds by the distributor; and
  compare the distribution data to the feed data to generate a list identifying an on-the-fly switch occurring on a single channel between a first one of the live media events and a second one of the live media events caused by the distributor, the first live media event being a live media event scheduled to be transmitted by the distributor at a first time, and generating the list comprises logging that the second live media event is actually transmitted by the distributor at the first time.

20. A tangible computer readable medium as defined in claim 19, wherein the list identifies the live media events by name.

21. A tangible computer readable as defined in claim 19, further comprising identifying the live media events by comparing a code present in the distribution data to a first library mapping codes to at least one of a station name, a distributor name, a content owner or a program name.

22. A tangible computer readable medium as defined in claim 21, wherein identifying the live media events comprises comparing a signature associated with the distribution data to a second library mapping signatures to at least one of a station name, a distributor name, a content owner or a program name.

23. A tangible computer readable medium as defined in claim 21, wherein the code present in the distribution data is collected at a reference station not present in a panelist household.

24. A tangible computer readable medium as defined in claim 19, further comprising identifying the live media events by comparing a signature associated with the distribution data to a second library mapping signatures to at least one of a station name, a distributor name, a content owner or a program name.

25. A tangible computer readable medium as defined in claim 24, wherein the signature associated with the distribution data is collected at a reference station not present in a panelist household.

26. A tangible computer readable medium as defined in claim 22, wherein the signature associated with the distribution data is collected at a reference station not present in a panelist household.

27. A tangible computer readable medium as defined in claim 19, wherein the plurality of distributions comprise at least one of an over-the-air television broadcast, cable delivery, satellite transmission, or Internet delivery.

28. A method as defined in claim 1, wherein at least a portion of the feed data and at least a portion of the distribution data are representative of a distribution of the first live media event, and collecting the portion of the feed data and collecting the portion of the distribution data occur during the first live media event.

29. A method as defined in claim 1, wherein generating the list comprises determining which of the plurality of source feeds is being distributed by the distributor at a first time by comparing the distribution data to the feed data.

30. A method as defined in claim 1, wherein the list identifies a first time at which the distributor starts distributing a first source feed associated with the first one of the live media events and a second time at which the distributor ends distribution of the first source feed or changes from distributing the first source feed to distributing a second source feed associated with the second one of the live media events.

* * * * *